United States Patent
Popovici

(10) Patent No.: US 6,873,943 B2
(45) Date of Patent: Mar. 29, 2005

(54) METHOD AND SYSTEM OF VECTORIAL CARTOGRAPHY

(75) Inventor: Lascar Popovici, Juan les Pins (FR)

(73) Assignee: Visteon Software Technologies, Valbonne (FR)

(*) Notice: Subject to any disclaimer, the term of this patent is extended or adjusted under 35 U.S.C. 154(b) by 557 days.

(21) Appl. No.: 10/020,965

(22) Filed: Dec. 19, 2001

(65) Prior Publication Data

US 2003/0040893 A1 Feb. 27, 2003

(30) Foreign Application Priority Data

Mar. 13, 2001 (FR) .............................................. 01 03375

(51) Int. Cl.$^7$ ......................... G06F 17/50; G06F 17/30
(52) U.S. Cl. ......................................... 703/2; 707/100
(58) Field of Search ........................ 703/2; 707/7, 100; 706/45; 345/619

(56) References Cited

U.S. PATENT DOCUMENTS

| | | | | |
|---|---|---|---|---|
| 5,030,117 A | * | 7/1991 | Delorme | .................... 434/130 |
| 5,694,534 A | * | 12/1997 | White et al. | ................ 345/440 |
| 5,963,956 A | * | 10/1999 | Smartt | ..................... 707/104.1 |
| 6,161,105 A | * | 12/2000 | Keighan et al. | ............ 707/100 |
| 6,728,728 B2 | * | 4/2004 | Spiegler et al. | ......... 707/103 R |
| 2002/0099675 A1 | * | 7/2002 | Agrafiotis et al. | ............ 706/15 |

OTHER PUBLICATIONS

T. Matsuyama et al., "A File Organization for Geographic Information Systems Based on Spatial Proximity," Computer Vision Graphics and Image Processing, Academic Press, Duluth, MA, US, vol. 26, No. 3, Jun. 1, 1984, pp. 303–318, XP000718799.

* cited by examiner

*Primary Examiner*—Thai Phan
(74) *Attorney, Agent, or Firm*—Brinks Hofer Gilson & Lione

(57) ABSTRACT

A method of retrieving an object contained in a domain δ within a space Δ containing a set of objects described in an initial matrix M, including construction of a subset ω of objects contained in the domain δ by extracting a matrix μ form the initial matrix M. A matrixing M of the space Δ is created by superimposing a large number of geometric matrices with different specifications ρ, each one of the meshes of each geometric matrix being identified by a unique and specific numerical value called a matrix code. The matrix M is sorted by matrix codes according to a predetermined order, with specifications ρ. Then the extraction matrix μ is constructed, describing only the objects affected by th meshes included in domain δ or intersected by domain δ.

16 Claims, 2 Drawing Sheets

Figure 1:
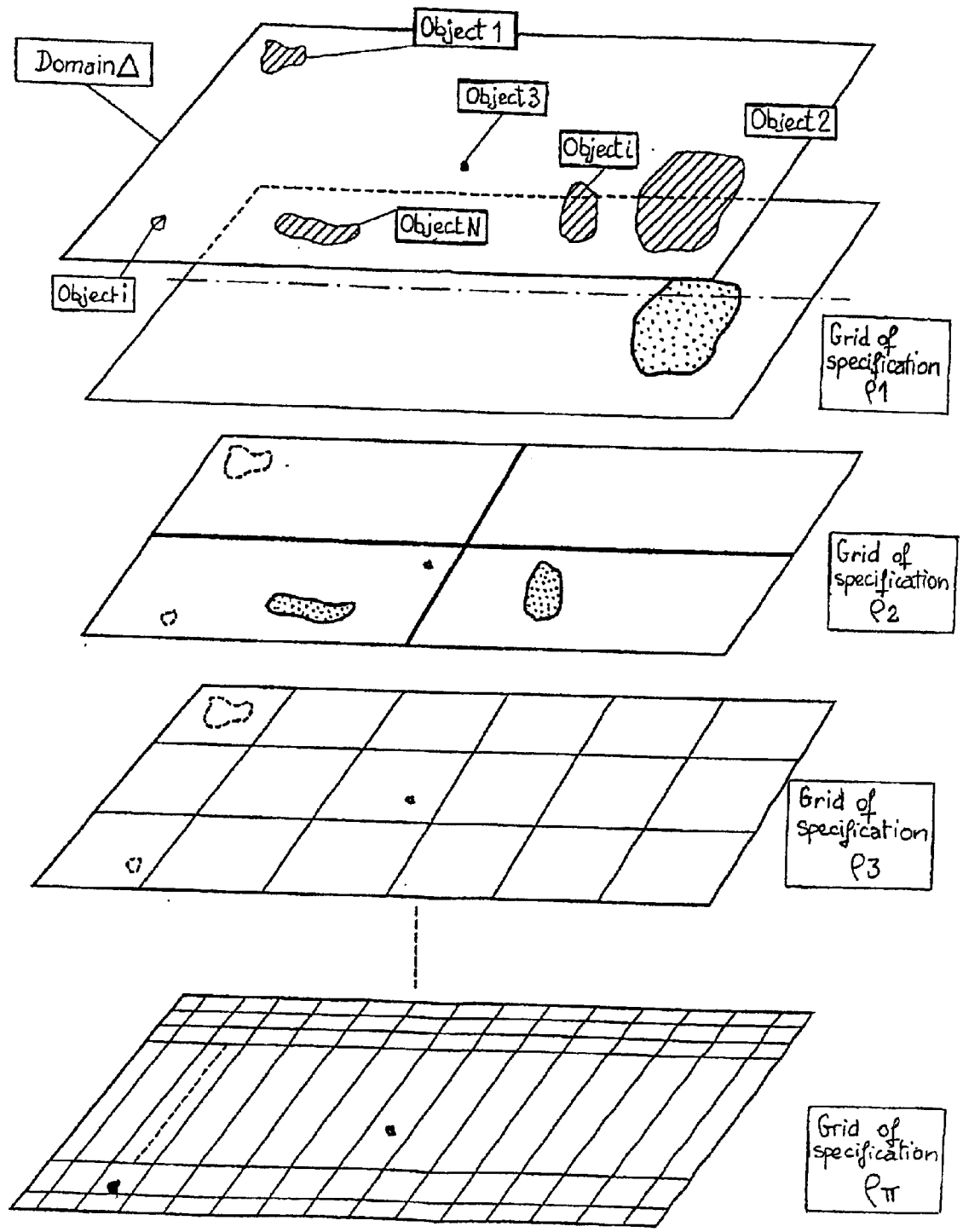

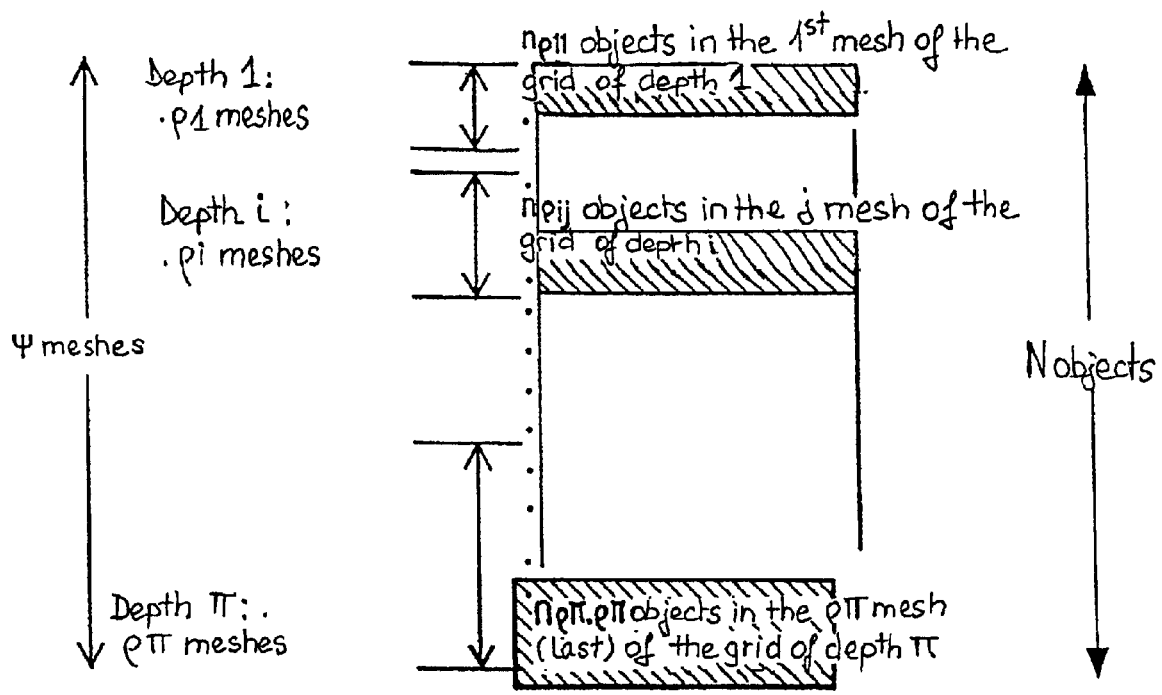
FIG_2

METHOD AND SYSTEM OF VECTORIAL CARTOGRAPHY

The present invention relates to a method of searching for an object within a space, as well as a search system implementing this method. It also relates to a method and a system of vectorial cartography incorporating this search technique, as well as electronic devices employing this method of vectorial cartography and media for vectorial cartography data obtained using the said method.

In vectorial cartography, the objects present in a domain are described in a matrix which may be of a considerable size and whose processing may be particularly time-consuming. Moreover, when it is a matter of searching for objects recorded in a subdomain of the principal domain, it becomes necessary to construct an extract from the principal matrix.

More generally, the problem posed is the determination of a subset of objects contained in a subdomain of a domain containing a set of semantically homogeneous objects of variable geometry, and the construction of a matrix describing the objects belonging to this subset.

Consider a set $\Omega$ of N objects that are semantically homogeneous and of variable geometry (shape and size). They are distributed randomly in the space OXYZ, where they occupy a domain $\Delta$ inscribed within a parallelepiped between $(X_{min}, Y_{min}, Z_{min})$ and $(X_{max}, Y_{max}, Z_{max})$, this parallelepiped constituting the limits of the "space" $\Lambda$ occupied by the domain.

In a two-dimensional system, the domain could be denoted by the term "territory", inscribed in a rectangle between $(X_{min}, Y_{min})$ and $(X_{max}, Y_{max})$. The N objects are described by a matrix M, which gives the shape for each one by means of a list of points (with coordinates) and topological descriptives (edges, faces, etc.). At the same time, the coordinates give the position of the object in space. Each object therefore has its own elementary space $\lambda$ represented by a circumscribed parallelepiped. The following observations can of course be made:

the elementary occupied spaces can intersect, $(X_{min}, Y_{min}, Z_{min})$ and $(X_{max}, Y_{max}, Z_{max})$ are the minimum and the maximum respectively of at least one elementary parallelepiped. This is true if there is no geometrically explicit definition of domain $\Delta$.

It is required to determine the subset $\omega$ of the v objects contained in a subdomain $\delta$ inscribed in a parallelepiped between $(x_{min}, y_{min}, z_{min})$ and $(x_{max}, y_{max}, z_{max})$ inside the parallelepiped circumscribing $\Delta$, and to construct the matrix $\mu$ describing them, the said matrix being an "extract" of M.

According to the problem posed, an object contained in $\delta$ can be regarded as meaning an object that is included completely or partially (object "touched" by or intersecting $\delta$).

Existing methods of speeding up the process will now be described:

If the order of description of the objects of $\Omega$ in the matrix M is random, to construct $\mu$ it is necessary to pass through all the N objects so as to verify for each one whether it belongs to $\delta$ and if so, increment each time v.

To speed up the construction of the extract $\mu$, it is necessary to transform M.

A first existing method of acceleration is preliminary sorting. Preliminary sorting of the objects of M makes it possible to speed up the search. The method used most widely is ordering of the objects in relation to the point $(x_{min}, Y_{min}, z_{min})$ of the parallelepiped of their elementary space $\lambda$. This makes it possible to reduce the number of complete checks of membership, by immediately eliminating all the objects for which this point is above $(x_{max}, Y_{max}, z_{max})$ of $\delta$; the process can be applied a second time for the other end. Membership is then checked for the remaining objects. There are several variants of this approach.

It will be noted that even if the complexity of certain checks is reduced (the smaller that $\delta$ is relative to $\Delta$, the greater is the reduction), it is necessary to go through all the N objects of M. Its avoidance would require the use of a dichotomizing search.

A second type of method of speeding up the construction of the extract $\mu$ consists of breaking down the domain $\Delta$ into $\Sigma$ subdomains $\Delta_i$ called tiles, hence the name tiling. Objects straddling one or more tiles (subdomains) will be cut at the boundaries and additional information (regarding connection, to ensure semantic continuity) will be recorded. The original matrix M will therefore be broken down into $\Sigma$ matrices $M_i$ each having $N_i$ objects. Obviously, $$\Sigma N_i \geq N$$

The domain $\delta$ searched will cover $\sigma$ tiles $\Delta_i$. The efficiency of the method will depend on the number $\Sigma$ of tiles of the original domain $\Delta$ and on the size ratio between $\delta$ and the $\Delta_i$, and therefore between $\sigma$ and $\Sigma$. On the other hand, unfortunately, the more we increase $\Sigma$, the more we increase the number of objects intersected and therefore the size of M. At the end, it will be possible for any objects that have been intersected to be reconstituted, thus making the tiling transparent.

Tiling immediately seems more beneficial than simple sorting, especially as the latter can be applied to each tile. This is why it is widely used, for example in cartography.

However, it has a major drawback in that it is necessary to cut the objects, and hence increase the total number of objects processed, consequently requiring the creation and use of boundary information, all of which complicates the processing algorithms.

The proposed objective, relative to the state of the art, is to speed up the process for obtaining the extract without altering the objects in any way, so as not to increase their number and hence the size of the matrix M containing, for each object, a list of points and topological descriptives.

To achieve this objective, the information on the elementary space occupied by each object is taken into account, this information either being contained initially in matrix M, or it must be calculated and then recorded in the matrix, and the set of objects is passed through a number of "sieves" of finer and finer mesh, so as to obtain groups of objects of particular sizes.

Thus, a method is proposed for searching for an object contained in a domain $\delta$ within a space $\Delta$ containing a set of objects described in an initial matrix M, comprising the construction of a subset $\omega$ of objects contained in the said domain $\delta$ by extracting a matrix $\mu$ from the initial matrix M.

According to the invention, the method comprises the following steps:

creation of a matrixing M of the space $\Delta$ by superimposing a number of geometric matrices with different specifications $\rho$ (mesh sizes), representing coverage of the domain by a defined, homogeneous set of similar subdomains, each of the meshes of each geometric matrix being identified by a unique specific numerical value called the matrix code, for the whole of the matrixing M, determination of all the meshes included in domain $\delta$ or intersected by domain $\delta$, and the number of relevant objects as the sum of the numbers of objects of the relevant meshes, sorting of matrix M by matrix codes following a predetermined order, for example decreasing, of the specifications ρ, and construction of the extraction matrix μ describing just the objects affected by the said meshes included in domain δ or intersected by domain δ.

It should be noted that document U.S. Pat. No. 5,030,117 describes a digital system for generating geographical maps, in which the cartographic data is organized according to a hierarchy of successive magnitudes or levels, in a pyramid shape with a small number of tiles (for example 4) at the top and $4^{16}$ tiles at the base of a pyramid consisting for example of 16 levels. Even though diagrams in this document, in particular FIGS. 8 and 13, show superimposed grids or matrices, it is not a question of a method of object retrieval according to a "multiple sieve" technique.

In addition, from document U.S. Pat. No. 5,694,534, a device is known for storing a representation of topological structures and methods for constructing and searching this representation. The device described comprises a data storage medium, a database stored on this medium and containing blocks carrying data representing topological characteristics of the structure represented at a given level of detail. The data in each of these blocks are a representation of a carrier which is a closed set that includes a given topological object. In the method described, it is a matter of constructing connected chains of cells constituting topological subcomplexes. The concept of multiple sieving for purposes of constructing an extraction matrix is not disclosed in this document.

In the search technique according to the invention, the objects can for example be sorted by increasing matrix codes.

In an advantageous embodiment of the invention, the search technique additionally comprises storage of a list of matrix codes with a pointer to the first object of each code.

Selection of the objects can be effected for example by a cursor which passes through the list of matrix codes.

According to another aspect of the invention, a method of vectorial cartography is proposed, for mapping a territory Δ comprising a set of objects described by a matrix M; employing the method of object retrieval according to the invention, characterized in that it comprises the following steps:

determination of the list of active meshes, comprising calculation of the set of matrix codes corresponding to the meshes that intersect the search domain δ, and selection of the objects and processing thereof if required.

When this method is implemented in a two-dimensional domain, it then comprises matrixing according to a number of rectangular geometric matrices having regular meshes, each geometric matrix having a different specification including the length and the width of the meshes of the said matrix.

For use in two-dimensional cartography extended to multiple levels, the method of vectorial cartography according to the invention then comprises the following sequences:

the initial set Ω of N objects is broken down into a large number Z of subsets $Ω_ζ$ of same-level objects, with ζ=1 to Z, the initial matrix M is broken down into Z matrices $M_ζ$, matrixing is employed independently for each subset.

According to yet another aspect of the invention, a system of vectorial cartography is proposed comprising means of processing objects contained in a domain δ within a space Δ containing a set of objects described in an initial matrix M, comprising construction of a subset ω of objects contained in the said domain δ by extracting a matrix μ from the initial matrix M, characterized in that it comprises in addition:

means for creating a matrixing M of the space Δ by superimposing a large number of geometric matrices with different specifications ρ, representing coverage of the domain with a defined and homogeneous set of similar subdomains, each of the meshes of each geometric matrix being identified by a unique specific index called the matrix code, means of determining, for the whole of the matrixing M, all of the meshes included in domain δ or intersected by domain δ, and the number of relevant objects as the sum of the number of objects with the relevant meshes, means of sorting the matrix M by matrix codes according to a predetermined order, for example decreasing, of the specifications ρ, and means of constructing the extraction matrix μ describing just the objects affected by the said meshes included in the domain δ or intersected by domain δ.

Other advantages and characteristics of the invention will become clear on examining the detailed description of one way of implementing it, which is in no way limiting, and the appended drawings in which:

FIG. 1 is a schematic representation of successive sieving carried out in the search method according to the invention; and FIG. 2 is a schematic diagram illustrating sorting of the matrix of objects from the set of objects by matrix codes The method proposed within the scope of the method of object retrieval according to the invention aims to speed up the process of obtaining the extract μ without altering the objects in any way, so as not to increase their number and consequently the size of the matrix M. To achieve this, it takes account of the elementary space λ occupied by each object, information that is contained in the matrix M, and uses it to organize successive "sieving", through "sieves" or "meshes" that become finer and finer.

As in granulometry, groups of objects of particular sizes are obtained. Thus, referring to FIG. 1, if we consider a domain Δ containing objects 1, 2, 3, . . . i, j . . . N, to which a set of grids of specifications ρ1, ρ2, ρ3, . . . ρΠ is applied, the grid of specification ρ1 will "hold back" object 2, the next grid of specification ρ2 will hold back objects j and N, whereas the grid of specification ρ3 does not hold back any of the objects under consideration, with the last grid of specification ρΠ finally collecting the object i and the point object 3.

If the space λ occupied by each object does not already exist in matrix M, it must be calculated. This space can, moreover, be recorded in matrix M, and in this case the size of M will increase by this information, but not the number of objects.

For a given size of object, the "sieve" is a geometric matrix representing the coverage of domain Δ by a defined, homogeneous set of similar subdomains, not necessarily equal but close to a standardized occupied space ρ. Coverage of the domain does not have to be strict, in the sense that although the domain is effectively completely covered, there may nevertheless be intersections between the subdomains (between "meshes"). The geometric matrix representing the subset described is called a standard grid ρ. Each of the $_ρ$ of the meshes of the grid is identified by a unique specific numerical value called the matrix code of specification ρ, $∩_ρ$. By superimposing Π grids with different specifications ρ, we create the matrixing M of depth Π of domain Δ. This will comprise a total of Ψ meshes:

$$\psi = _{.\rho 1} + _{.\rho 2} + \ldots + _{.\rho \Pi} \quad (3.1)$$

each one identified by its matrix code $\cap_{\rho ij}$, with i=1, Π (the depth, from 1 to Π) and j=1, $_{.\rho i}$ (the number of the mesh in the grid of depth i, from 1 to $_{.\rho i}$). The first grid generally consists of a single mesh covering the whole domain and gathers together all the objects which, regardless of the space they occupy λ, never "fall" into a finer mesh, but always "straddle" the whole sieve; then, of course, $_{.\rho i}$=1.

Within a given matrixing M it is possible—and relatively easy—to determine, for each object of the set Ω, the smallest mesh of specification ρ that contains it completely (the specification will always be greater than or equal to the space occupied: ρ≧λ) and hence ascribe to it a matrix code $\cap_{\rho ij}$. Next we sort the matrix M of N objects of the set Ω by matrix codes, for example in decreasing order of specifications ρ. We thus obtain an ordered description of the N objects in the sorted matrix M, ranging from those occupying the most space, to the "smallest" ones. For a given mesh, identified by its matrix code, there will be n objects; obviously, Σn=N and certain n may be zero. The sort can be illustrated by the schematic diagram in FIG. 2.

For construction of the subset ω of υ objects contained in domain δ, and therefore the extract μ from matrix M, we proceed in two steps:

A. Determine, for the whole of the matrixing M (of depth Π), all the meshes of all the grids included in and intersected by δ. For each grid (of specification $\rho_i$) there will be $_{.\rho i}$ meshes, $_{.\rho i} \leq _{.\rho i}$ from (3.1); the total number of grids involved will be $$\psi = _{.\rho 1} + _{.\rho 2} + \ldots + _{.\rho \Pi} \quad (3.2)$$

and therefore $_\psi \leq \Psi$. The number of relevant objects, N, is the sum of the numbers of objects of the relevant meshes and therefore also N≦N. The inequalities are greater the smaller δ is, relative to Δ.

B. With the matrix ordered as in the above scheme (or any other indexing system permitting direct access to the objects of a mesh, and therefore of a given matrix code), only the objects affected by the ψ meshes adopted are verified directly. The problem posed initially, i.e. determination of the subset ω of the ν objects contained in domain δ and construction of the matrix μ describing them, requires no more than examination of the N objects (and not the initial N).

As in the case of tiling, the sort can be applied in each mesh. The first major advantage of matrixing relative to tiling is that none of the objects of Ω is altered, and the size of the description matrix M therefore remains unchanged. The efficiency of matrixing does of course depend on the fineness of mesh, and therefore on the depth Π, just as the efficiency of tiling depends on Σ, but there is no other obstacle to increasing the depth. The only obvious condition to be observed is $$\rho \Pi = \rho_{min} > \lambda_{min} \quad (3.3)$$

The choice of optimum depth is a function of the distribution of the spaces λ occupied by the objects of Ω and of the space Λ occupied by the latter, and hence of the field of application of the problem posed:

in astrophysics Λ is much larger than $\lambda_{max}$ and therefore we can have a very fine mesh starting from the second grid; Π will be small, even limited to 2;

in cartography, $\lambda_{max} \cong \Lambda$ and $\lambda_{max} >> _{min}$; while observing (3.3), Π can be large and will be chosen in relation to the distribution of the λ's, all other constraints being the same.

In the particular case of point objects, the objects occupying zero space (λ=0) are objects reduced to a point relative to domain Δ. The number of them varies depending on the field of application: very numerous in astrophysics, less numerous in cartography. Obviously, all of these point objects will be located in the meshes of the finest matrix, the grid of depth Π. It should be noted that if Ω contained such point objects exclusively, tiling and matrixing would be of equivalent efficiency. It will be noted that simple sorting combined with a dichotomizing search would also be very efficient.

We shall now give an example of implementation of the method of two-dimensional vectorial cartography. The territories (the domains Δ), for a given set Ω of N objects, described by a matrix M, cover on average the extent of a region, or even a small country. The space Λ occupied by the domain is the diagonal of the rectangle [($X_{min}$, $Y_{min}$), ($X_{max}$, $Y_{max}$)] circumscribing it. The sides of the rectangle are respectively $\Delta X = X_{max} - X_{min}$ and $\Delta Y = Y_{max} - Y_{min}$.

Each object is circumscribed by an "elementary" rectangle [($x_{min}$, $y_{min}$), ($x_{max}$, $y_{max}$)], whose diagonal constitutes the space λ occupied by the object.

The matrixing M is made up of rectangular grids with regular meshes ensuring strict coverage. The specification ρi of the grid of depth i is given by the length (on X) and the width (on Y) of the meshes:

$$\rho_{ix} = \Delta X / >_{ix} \text{ and } \rho_{iy} = \Delta Y / >_{iy} \quad (4.1)$$

For the grid of depth i, we shall therefore have $_{.\rho i} => _{ix} * >_{iy}$ rectangular meshes. A series of Π values for $>_{ix}$ and for $>_{iy}$ gives the matrixing M of depth Π of domain Δ.

In the example of implementation presented here, it has been stipulated, for reasons of conciseness, that all the matrix codes $\cap_{\rho ij}$ should be coded on a single octet. For simplicity, we chose an equal number of meshes in both directions $>==>_{ix}=_{iy}$ with the series of values $$>=\{1, 2, 3, 7, 13\} \quad (4.2)$$

of depth Π=5 and which has, for the grid of the first depth, a single mesh equal to the territory. The use of a series of prime numbers guarantees that the boundaries of two meshes with different depths are never superimposed. Thus, an object whose occupied space is less than that of a mesh of depth i but whose geometry does not allow it to be ascribed to a mesh at this depth (because it "straddles" at least two meshes of this depth), has every chance of being ascribed to a mesh at the next lower depth (i−1). Whatever the extraction domain, the number of inactive meshes (i.e. not intersecting the domain) increases with the depth (this increase is not necessarily strict, of course). The result is that the efficiency of a meshing system increases with increasing proportion of objects situated in the meshes with the greatest depths.

The total number of meshes Ψ is $$\Psi = 1^2 + 2^2 + 3^2 + 7^2 + 13^2 = 232 \quad (4.3)$$

with the matrix codes indexable on an octet, from 0 to 231. The mesh/index correspondence is as follows:

| depth 5: | grid 13 × 13: | 0 to 168 |
| depth 4: | grid 7 × 7: | 169 to 217 |
| depth 3: | grid 3 × 3: | 218 to 226 |
| depth 2: | grid 2 × 2: | 227 to 230 |
| depth 1: | grid 1 × 1: | 231 |

Within the same grid, the meshes are sorted by increasing x and then by increasing y, as shown in Table 1 below. Extraction proper is made up of two steps:

determination of the list of active meshes, selection of the objects and processing thereof if required.

Determination of the active meshes merely consists of calculating the set of matrix codes corresponding to the meshes that intersect the search domain δ (in this case a rectangle).

In the file, the objects are sorted by increasing matrix codes. A list of the matrix codes with a pointer to the first object of each code is also stored in the file. Selection of the objects is effected by a cursor that passes through the list of matrix codes.

TABLE 1

Depth 5: 13 × 13

| 12 | 25 | 38 | 51 | 64 | 77 | 90 | 103 | 116 | 129 | 142 | 155 | 168 |
|----|----|----|----|----|----|----|-----|-----|-----|-----|-----|-----|
| 11 | 24 | 37 | 50 | 63 | 76 | 89 | 102 | 115 | 128 | 141 | 154 | 167 |
| 10 | 23 | 36 | 49 | 62 | 75 | 88 | 101 | 114 | 127 | 140 | 153 | 166 |
| 9  | 22 | 35 | 48 | 61 | 74 | 87 | 100 | 113 | 126 | 139 | 152 | 165 |
| 8  | 21 | 34 | 47 | 60 | 73 | 86 | 99  | 112 | 125 | 138 | 151 | 164 |
| 7  | 20 | 33 | 46 | 59 | 72 | 85 | 98  | 111 | 124 | 137 | 150 | 163 |
| 6  | 19 | 32 | 45 | 58 | 71 | 84 | 97  | 110 | 123 | 136 | 149 | 162 |
| 5  | 18 | 31 | 44 | 57 | 70 | 83 | 96  | 109 | 122 | 135 | 148 | 161 |
| 4  | 17 | 30 | 43 | 56 | 69 | 82 | 95  | 108 | 121 | 134 | 147 | 160 |
| 3  | 16 | 29 | 42 | 55 | 68 | 81 | 94  | 107 | 120 | 133 | 146 | 159 |
| 2  | 15 | 28 | 41 | 54 | 67 | 80 | 93  | 106 | 119 | 132 | 145 | 158 |
| 1  | 14 | 27 | 40 | 53 | 66 | 79 | 92  | 105 | 118 | 131 | 144 | 157 |
| 0  | 13 | 26 | 39 | 52 | 65 | 78 | 91  | 104 | 117 | 130 | 143 | 156 |

Depth 4: 7 × 7

| 175 | 182 | 189 | 196 | 203 | 210 | 217 |
|-----|-----|-----|-----|-----|-----|-----|
| 174 | 181 | 188 | 195 | 202 | 209 | 216 |
| 173 | 180 | 187 | 194 | 201 | 208 | 215 |
| 172 | 179 | 186 | 193 | 200 | 207 | 214 |
| 171 | 178 | 185 | 192 | 199 | 206 | 213 |
| 170 | 177 | 184 | 191 | 198 | 205 | 212 |
| 169 | 176 | 183 | 190 | 197 | 204 | 211 |

Depth 3: 3 × 3

| 220 | 223 | 226 |
|-----|-----|-----|
| 219 | 222 | 225 |
| 218 | 221 | 224 |

Depth 2: 2 × 2

| 228 | 230 |
|-----|-----|
| 227 | 229 |

Depth 1: 1 × 1

231

When the cursor encounters an active code, the latter then passes through the set of objects with this code. Only the objects "seen" by the cursor are "processed". The processing itself can in its turn effect a sort, since the objects selected by the cursor do not necessarily intersect domain δ (the fact that the mesh to which an object is associated intersects domain δ is a condition that is necessary but not sufficient). This second sort is, naturally, heavier, since it requires reading of each object, then calculation of intersection with domain δ. We can thus understand the benefit of the preliminary sort effected by the cursor on the basis of the matrixing system.

We shall now describe an example of application of the method of vectorial cartography with a pseudo-three-dimensional or two-dimensional extent (called "at levels").

In certain fields of application, such as "road-map" cartography (intended for applications in road-traffic guidance and navigation), it is not necessary to operate on a set of objects in 3D (with the Z for all the points), whose matrix M is inevitably more bulky than that of the set of the same objects represented on the flat (in 2D). In fact, to solve for example the problem of correct 2D graphical representation, it would be sufficient to know the relative vertical position of the objects: in short, it is sufficient to know who passes over whom (the "over/under" problem).

The concept of level is then introduced: a level is made up of the set of objects located at one and the same relative vertical position.

The method of vectorial cartography, when employed in an extended pseudo-three-dimensional or two-dimensional application, then comprises the following sequences:

The initial set Ω of N objects is broken down into Z (total number of levels identified) subsets Ωζ of objects with the same level, with ζ=1 to Z The initial matrix M is broken down into Z matrices $M_\zeta$.

The matrixing described above is used independently for each subset.

In other words, the initial set is first sorted by levels and then by spaces occupied, with the corresponding grids; in addition, this permits the use of different matrixing for different levels.

Matrixing is employed in two separate stages in the method of searching for objects belonging to a subset:

a first stage comprising:
  definition of the matrixing M itself, i.e. selection of the grids,
  sorting of the objects of the set by increasing or decreasing order of their matrix code $\cap_{\rho ij}$, with i=1, II (the depth, from 1 to II) and j=1, $_{\rho i}$ (the number of the mesh in the grid of depth i, from 1 to $_{\rho i}$).

a second stage comprising:
  a step A of searching the "active" meshes (in this instance, the active matrix codes), i.e. those affected by δ,
  for each active matrix code $\cap_{\rho ij}$, a step B of searching the corresponding objects and of verification, for them alone, of membership of δ.

We now present an example of implementation of matrix codes in the C++ language for the second stage of the method. So that the extracts of codes that follow can be understood, the definitions of four types and structures used are given below:

```
// Types
typedef TGF_INT32            long;
typedef TGF_UINT32           unsigned long;
// Structures
typedef struct {
    TGF_INT32                x;
    TGF_INT32                y;
} TGF_LONGPOINT;
typedef struct {
    TGF_LONGPOINT            min;
    TGF_LONGPOINT            max;
} TGF_LONGRECT;
```

The class CGFMatrixHandler contains all the methods that can be used in calculations connected with matrix codes. The method that follows permits determination of the list of "active" matrix codes (step A) relative to a domain (in this case a rectangle). The Boolean table mMatrixCodesList, class member data, is dimensioned by the total number of matrix codes.

```
// Given inRect, compute list of "active" matrix codes
bool * CGFMatrixHandler::GetMatrixCodesList(TGF_LONGRECT inRect)
{
    // Get global territory (domain)
    TGF_LONGRECT territory = Get Territory( );
    // Reset mMatrixCodesList. GetNbMatrixCodes returns total number
    of matrix codes memset(mMatrixCodesList, false,
    GetNbMatrixCodes( )*sizeof(bool));
    // Now set "active" codes to "true"
    TGF_LONGRECT currentMatrixSquare;
    TGF_UINT32 w, h, col, line, res, currentCode = 0;
    // GetCount( ) returns matrix's "deepness" (number of levels)
    for (TGF_UINT32 i=0; i<GetCount( ); i++) {
        // GetLevel(i) returns grid's resolution for level i
        res = GetLevel(i);
        // Compute matrix squares' dimension at level i
        w = (territory.max.x - territory.min.x + res-1) / res;
        h = ((territory.max.y - territory.min.y + res-1) / res;
        // initialize currentMatrixSquare
        currentMatrixSquare.min.x = territory.min.x;
        currentMatrixSquare.max.x = currentMatrixSquare.min.x+w;
        // Loop on each matrix square of level i
        for (col=0; col<resol; col++){
            currentMatrixSquare.min.y = territory.min.y;
            currentMatrixSquare.max.y = currentMatrixSquare.min.y +
            h; for (line=0; line<resol; line++) {
                // Check if currentMatrixSquare intersects inRect.
                // If so, currentCode is "active"
                if (RectIntersectsRect(currentMatrixSquare, inRect))
                    mMatrixCodesList[currentCode] = true;
                currentCode++;
                currentMatrixSquare.min.y += h;
                currentMatrixSquare.max.y += h:
            }
            currentMatrixSquare.min.x+=w
            currentMatrixSquare.max.x+=w;
        }
    }
    return mMatrixCodesList;
}
```

The class CGFCursor permits access to the relevant objects (first part of step B), applying a filter to the matrix codes. The method Next( ) permits access to the next object in the file taking this filter into account.

```
CGFCursor::CGFCursor(bool * inMatrixValues)
    :    mMatrixCodes(inMatrixValues)
{
    mCurMatrixCode = GetMatrixHandler( )->GetNbMatrixCodes( )-1;
    mCurMatrixCodeIndex = (TGF_UINT32) -1;
    mCurMatrixCodeObjectsCount (TGF_UINT32) -1;
    mCurObjectInMatrixCode (TGF_UINT32) -1;
    mCurObjectOffset = (TGF_UINT32) -1;
    mCurObjectSize = 0;
    minitialized = false;
}
// Return offset of next object in file or (TGF_UINT32) -1 if none
TGF_UINT32 CGFCursor::Next( )
{
    for (;;) {
        // Move on to the next object
        for (;;) {
            // Calculate the offset of this object. if current object's
            // offset is -1, then we are at the beginning of a matrix code
            // and we don't need to increment the previous offset to get to
            // the current one.
            if (mCurObjectOffset != (TGF_UINT32) -1) {
                // Next object in current matrix code
                if (++mCurObjectInMatrixCode >=
                    mCurMatrixCodeObjectsCount) break;
                // Compute the next object's position
                mCurObjectOffset += mCurObjectSize;
            }
            else {
                mCurObjectInMatrixCode = 0;
                mCurObjectOffset =
        GetFirstObjectInNthMatrixCode(mCurMatrixCodeIndex);
            }
            return mCurObjectOffset;
        }
        // Move on to the next matrix code
        NextMatrixCode( );
    }
}
bool CGFCursor::NextMatrixCode( )
{
    // Reset the current offset so that the Next( ) method
    // knows that it should start at the beginning of the matrix code.
    mCurObjectOffset = (TGF_UINT32) -1;
    mCurObjectSize = 0;
    mCurObjectInMatrixCode = (TGF_UINT32) -1;
    mCurMatrixCodeObjectsCount = (TGF_UINT32) -1;
    // Handle the case where we are filtering on a matrix codes' list
    if (mMatrixCodes) {
        for(;;) {
            // Get the next code
            if (++mCurMatrixCodeIndex >=
                GetMatrixCodesCount( )) {
                mCurMatrixCodeIndex = (TGF_UINT32) -1;
                mCurMatrixCode = GetMatrixHandler( )->
                    GetNbMatrixCodes( ) -1;
                return false;
            }
            TGF_UINT32 code =
            GetNthMatrixCode(mCurMatrixCodeIndex);
            // if this code is activated in the array, update variables
            if (mMatrixCodes[code]) {
                mCurMatrixCode = code;
                mCurMatrixCodeObjectsCount =
        GetObjectCountInNthMatrixCode(mCurMatrixCodeIndex);
                return true;
            }
        }
    }
    // Not filtering on matrix codes: get the next code
    if (++mCurMatrixCodeIndex >= GetMatrixCodesCount( )) {
        // Does not exist
        mCurMatrixCodeIndex = (TGF_UINT32) -1;
        mCurMatrixCode = GetMatrixHandler( )
            ->GetNbMatrixCodes( )-1;
        return false;
    }
    mCurMatrixCode = GetNthMatrixCode(mCurMatrixCodeIndex);
    mCurMatrixCodeObjectsCount =
```

-continued

```
        GetObjectCountInNthMatrixCode(mCurMatrixCodeIndex);
    return true;
}
```

Access to the objects intersecting a rectangle rect (second part of step B) is then effected in the following way:

```
{
    TGF_LONGRECT rect, domain;
    TGF_UINT32 * matrixLevelList;
    // Set rect and get file's domain and matrixLevelList
    CGFMatrixHandler * mtxHdl =
    new(CGFMatrixHandler(domain, matrixLevelList));
    CGFCursor * iter =
    new(CGFCursor(mtxHdl->GetMatrixCodesList(rect)));
    while (iter->Next( ) != (TGF_UINT32) −1) {
        // Read current object at offset iter->GetCurObjectOffset( )
        // Check if object intersects rect (its matrix code does but not
        // necessarily the object itself).
        // If so, process object
    }
}
```

A practical application of the search method according to the invention can be to carry out the first stage once and for all for a given domain, before loading it into a reading device or equipment, especially if regular usage of the domain is anticipated.

The second stage is always to be executed each time a search is requested and therefore permanent installation in the user terminal may be preferred.

The extracts $\mu$ thus obtained by employing the method of vectorial cartography according to the invention can be stored in any type of data medium and incorporated in electronic equipment, such as equipment for communication and/or navigation.

Of course, the invention is not limited to the examples that have just been described, and numerous adjustments can be made to these examples while remaining within the scope of the invention.

What is claimed is:

1. A method of retrieving an object contained in a domain $\delta$ within a space $\Delta$ containing a set of objects described in an initial matrix M, comprising a construction of a subset $\omega$ of objects contained in the said domain $\delta$ by extraction of a matrix $\mu$ from the initial matrix M, characterized in that it comprises the following steps:
    creation of a matrixing M of the space $\Delta$ by superimposing a number of geometric matrices with different specifications $\rho$, representing coverage of the domain by a defined, homogeneous set of similar subdomains, each of the meshes of each geometric matrix being identified by a unique specific numerical value called the matrix code,
    for the whole of the matrixing M, determination of all the meshes included in domain $\delta$ or intersected by domain $\delta$, and the number of relevant objects as the sum of the numbers of objects of the relevant meshes,
    sorting of matrix M by matrix codes following a predetermined order, increasing or decreasing, of the specifications $\rho$, and
    construction of the extraction matrix $\mu$ describing just the objects affected by the said meshes included in domain $\delta$ or intersected by domain $\delta$.

2. A method of retrieving an object according to claim 1, characterized in that the objects are sorted by increasing or decreasing matrix codes.

3. A method of retrieving an object according to claim 1, characterized in that it comprises in addition storage of a list of matrix codes with a pointer to the first object of each code.

4. A method of retrieving an object according to claim 1, characterized in that selection of the objects is effected by a cursor which passes through the list of matrix codes.

5. A method of retrieving an object according to claim 4, characterized in that, when the cursor encounters an active code, the said cursor then passes through the set of objects with that code, only the objects scanned by the said cursor being processed.

6. A method of retrieving an object according to claim 5, characterized in that the processing of the selected objects comprises a second sort to exclude from the said processing, those of the objects selected by the said cursor which do not necessarily intersect the domain $\delta$.

7. A method of retrieving an object according to claim 6, characterized in that the sort comprises reading of each object, then calculation of intersection with domain $\delta$.

8. A method of retrieving an object according to claim 1, characterized in that it comprises:
    a first stage (1) comprising:
        definition of a matrixing M, a sort of the objects of the set of objects of the set of the objects by increasing or decreasing order of their matrix code $\cap_{\rho ij}$, with i=1, $\Pi$ (depth) and j=1, $_{.\rho i}$ (number of the mesh in the grid of depth i),
        definition of the matrixing M comprising selection of the grids;
        sorting of the objects of the set by increasing or decreasing order of their matrix code $\cap_{\rho ij}$, with i=1, $\Pi$ (depth) and j=1, $_{.\rho i}$ (number of the mesh in the grid of depth i) and
    a second stage (2) of searching for the v objects contained in the search domain $\delta$ forming the subset $\omega$, comprising:
        a search of the "active" meshes (active matrix codes), which are affected by the search domain $\delta$,
        for each active matrix code $\omega_{\rho ij}$, a search of the corresponding objects and verification, for the said corresponding objects only, of membership of the search domain $\delta$.

9. A method of retrieving an object according to claim 1, characterized in that the stage (1) of the definition and sorting of objects is carried out once and for all in a data domain, the results of the said stage (1) of definition and sorting of objects being loaded into a reading device, and in that the search stage (2) is to be executed each time a search is requested.

10. A method of retrieving an object according to claim 9, characterized in that the search stage (2) is implemented in the form of an executable program stored within a user terminal.

11. A method of vectorial cartography, for mapping a territory $\Delta$ comprising a set of objects described by a matrix M; employing the method of object retrieval according to one of the preceding claims, characterized in that it comprises the following steps:
    determination of the list of active meshes, comprising calculation of the set of matrix codes corresponding to the meshes that intersect the search domain $\delta$, and
    selection of the objects and processing thereof if required.

12. A method of vectorial cartography according to claim 11, employed in a two-dimensional domain, characterized in that it comprises matrixing according to a large number of rectangular geometric matrices comprising regular meshes, each geometric matrix possessing a different specification including the length and the width of the meshes of the said matrix.

13. A method of vectorial cartography according to claim 11, employed in two-dimensional cartography extended to multiple levels, characterized in that it comprises the following sequences:

the initial set $\Omega$ of N objects is broken down into a large number of Z subsets $\Omega_\zeta$ of objects with the same level, with $\zeta=1$ to Z, the initial matrix M is broken down into Z matrices $M_\zeta$, matrixing is used independently for each subset.

14. Electronic apparatus, in particular equipment for communication and/or navigation, employing the method of vectorial cartography according to claim 11.

15. A data medium containing vectorial cartography data processed by the method of vectorial cartography according to claim 11.

16. A system of vectorial cartography, comprising means for processing objects contained in a domain $\delta$ within a space $\Delta$ containing a set of objects described in an initial matrix M, comprising construction of a subset $\omega$ of objects contained in the said domain $\delta$ by extraction of a matrix $\mu$ from the initial matrix M, characterized in that it additionally comprises:

means for creating a matrixing M of the space $\Delta$ by superimposing a large number of geometric matrices with different specifications $\rho$, representing coverage of the domain with a defined, homogeneous set of similar subdomains, each one of the meshes of each geometric matrix being identified by unique specific index called a matrix code, means for determining, for the whole of the matrixing M, all of the meshes included in domain $\delta$ or intersected by domain $\delta$ and the number of relevant objects as the sum of the numbers of objects of the relevant meshes, means for sorting the matrix M by matrix codes according to a predetermined order, increasing or decreasing, of specifications $\rho$, and means for constructing the extraction matrix $\mu$ describing only those objects affected by the said meshes included in domain $\delta$ or intersected by domain $\delta$.

* * * * *